(12) United States Patent
Gao et al.

(10) Patent No.: US 12,373,459 B2
(45) Date of Patent: Jul. 29, 2025

(54) CHANGE-AWARE SNAPSHOT REPLICATION

(71) Applicant: SAP SE, Walldorf (DE)

(72) Inventors: Yu Gao, Xi'an (CN); Junpeng Liu, Xi'an (CN); Zhifeng Xu, Xi'an (CN); Hyeong Seog Kim, Seoul (KR); Won Wook Hong, Seoul (KR); Ji Hoon Jang, Seoul (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/227,207

(22) Filed: Jul. 27, 2023

(65) Prior Publication Data
US 2025/0036650 A1 Jan. 30, 2025

(51) Int. Cl.
*G06F 17/00* (2019.01)
*G06F 16/27* (2019.01)

(52) U.S. Cl.
CPC .................................... *G06F 16/27* (2019.01)

(58) Field of Classification Search
CPC ........ G06F 16/13; G06F 16/24; G06F 16/156; G06F 16/178; G06N 3/00; G06N 5/00; G05B 13/00
See application file for complete search history.

(56) References Cited

U.S. PATENT DOCUMENTS

| | | | |
|---|---|---|---|
| 7,653,668 B1 * | 1/2010 | Shelat | G06F 16/184 707/610 |
| 7,765,186 B1 * | 7/2010 | Hu | G06F 16/273 707/704 |
| 8,977,826 B1 * | 3/2015 | Meiri | G06F 11/2064 711/159 |
| 9,483,511 B2 * | 11/2016 | Prahlad | G06F 16/182 |
| 9,507,843 B1 * | 11/2016 | Madhavarapu | G06F 16/2358 |
| 10,140,039 B1 * | 11/2018 | Baruch | G06F 11/2094 |
| 10,705,927 B2 * | 7/2020 | Killamsetti | G06F 11/1662 |
| 10,983,719 B1 * | 4/2021 | Williams | G06F 3/0604 |
| 11,010,351 B1 * | 5/2021 | Potnis | G06F 9/45558 |
| 11,068,500 B1 * | 7/2021 | Meiri | G06F 16/27 |

(Continued)

FOREIGN PATENT DOCUMENTS

WO  WO 2022/120481  6/2022

OTHER PUBLICATIONS

Extended European Search Report received in European Application No. 24186173.1, Jan. 27, 2025, 11 pages.

*Primary Examiner* — Hung D Le
(74) *Attorney, Agent, or Firm* — Klarquist Sparkman, LLP

(57) ABSTRACT

Disclosed techniques and solutions can provide improved snapshot replication. Typically, an initial replica obtained using snapshot replication is periodically updated. However, the update process can unnecessarily consume computing resources if data in a source data object has not changed with respect to data in a replica data object. Disclosed techniques check to determine whether a snapshot replica is out of date before obtaining a new snapshot. The checks can be performed on manual request or on the occurrence of triggers, such as receiving a query that accesses the replica data object or according to a schedule. Information for current and prior versions of the remote data object can be compared to determine whether a replica is out of date, such as digest values of contents of the remote data object or timestamps associated with the remote data object.

34 Claims, 9 Drawing Sheets

(56) References Cited

U.S. PATENT DOCUMENTS

| | | | |
|---|---|---|---|
| 11,080,148 B2* | 8/2021 | Natanzon | G06F 11/1451 |
| 11,119,862 B2* | 9/2021 | Dewey | G06F 3/065 |
| 11,550,816 B1* | 1/2023 | Quan | G06F 3/065 |
| 11,630,838 B1* | 4/2023 | Gujral | G06F 16/9024 |
| | | | 707/625 |
| 2007/0198599 A1* | 8/2007 | Tobies | G06F 16/27 |
| 2011/0307736 A1* | 12/2011 | George | G06F 3/0685 |
| | | | 714/6.2 |
| 2012/0233119 A1* | 9/2012 | Barton | H04L 67/1097 |
| | | | 707/622 |
| 2013/0246367 A1* | 9/2013 | Clayton | G06F 11/3051 |
| | | | 707/655 |
| 2015/0169225 A1* | 6/2015 | Curley | H04L 67/1095 |
| | | | 711/162 |
| 2016/0105313 A1* | 4/2016 | Jha | H04L 41/0816 |
| | | | 709/217 |
| 2017/0032012 A1* | 2/2017 | Zhang | G06F 16/182 |
| 2017/0177658 A1* | 6/2017 | Lee | G06F 11/1451 |
| 2017/0192860 A1* | 7/2017 | Vijayan | G06F 3/0632 |
| 2019/0243823 A1 | 8/2019 | Lee et al. | |
| 2020/0034475 A1* | 1/2020 | Venkatesan | G06F 3/0647 |
| 2020/0133919 A1* | 4/2020 | Ren | G06F 3/0641 |
| 2020/0159851 A1* | 5/2020 | Madhavan | G06F 16/212 |
| 2020/0167316 A1* | 5/2020 | Hupfeld | H04L 67/1097 |
| 2020/0218711 A1* | 7/2020 | Natanzon | G06F 16/184 |
| 2020/0233881 A1* | 7/2020 | Harduf | G06F 16/2365 |
| 2020/0301784 A1* | 9/2020 | Chen | G06F 3/0604 |
| 2020/0342065 A1* | 10/2020 | Chen | H04L 67/1095 |
| 2020/0363957 A1* | 11/2020 | Patel | G06F 3/0614 |
| 2020/0409570 A1* | 12/2020 | Wolfson | G06F 11/1469 |
| 2020/0409974 A1* | 12/2020 | Ayzenberg | G06F 16/2246 |
| 2021/0141770 A1* | 5/2021 | Wang | G06F 16/185 |
| 2021/0216571 A1* | 7/2021 | Chen | G06F 11/1464 |
| 2021/0224163 A1* | 7/2021 | Chen | G06F 16/2237 |
| 2021/0263649 A1* | 8/2021 | Chen | G06F 3/0665 |
| 2021/0279229 A1* | 9/2021 | Parasnis | G06F 16/27 |
| 2021/0303164 A1* | 9/2021 | Grunwald | G06F 3/0629 |
| 2021/0311835 A1* | 10/2021 | Futey | G06F 11/1451 |
| 2021/0326359 A1* | 10/2021 | Upton | G06F 3/065 |
| 2021/0334003 A1* | 10/2021 | Agrawal | G06F 3/067 |
| 2021/0342297 A1* | 11/2021 | Gupta | G06F 16/128 |
| 2021/0373780 A1* | 12/2021 | Ferrari | G06F 3/0653 |
| 2022/0124593 A1* | 4/2022 | Mátray | H04L 67/1095 |
| 2022/0138223 A1* | 5/2022 | Sonner | G06F 16/27 |
| | | | 707/620 |
| 2022/0253219 A1* | 8/2022 | Grunwald | G06F 3/067 |
| 2022/0253254 A1* | 8/2022 | Karr | G06F 3/0664 |
| 2022/0263897 A1* | 8/2022 | Karr | G06F 11/1471 |
| 2022/0342549 A1* | 10/2022 | Adams | G06F 3/067 |
| 2022/0342551 A1* | 10/2022 | Bora | G06F 11/1435 |
| 2022/0342762 A1* | 10/2022 | Bora | G06F 3/0619 |
| 2022/0342905 A1* | 10/2022 | Ben-Yehuda | G06F 16/1844 |
| 2022/0398163 A1* | 12/2022 | Bezbaruah | G06F 11/2097 |
| 2023/0342064 A1* | 10/2023 | Haravu | G06F 3/0689 |
| 2023/0409539 A1* | 12/2023 | Bisht | H04L 9/0819 |
| 2024/0045774 A1* | 2/2024 | Wang | G06F 11/1469 |
| 2024/0061814 A1* | 2/2024 | Kashi Visvanathan | G06F 12/0253 |
| 2024/0104062 A1* | 3/2024 | Kashi Visvanathan | G06F 16/178 |
| 2024/0143554 A1* | 5/2024 | Kaushik | G06F 3/0611 |

\* cited by examiner

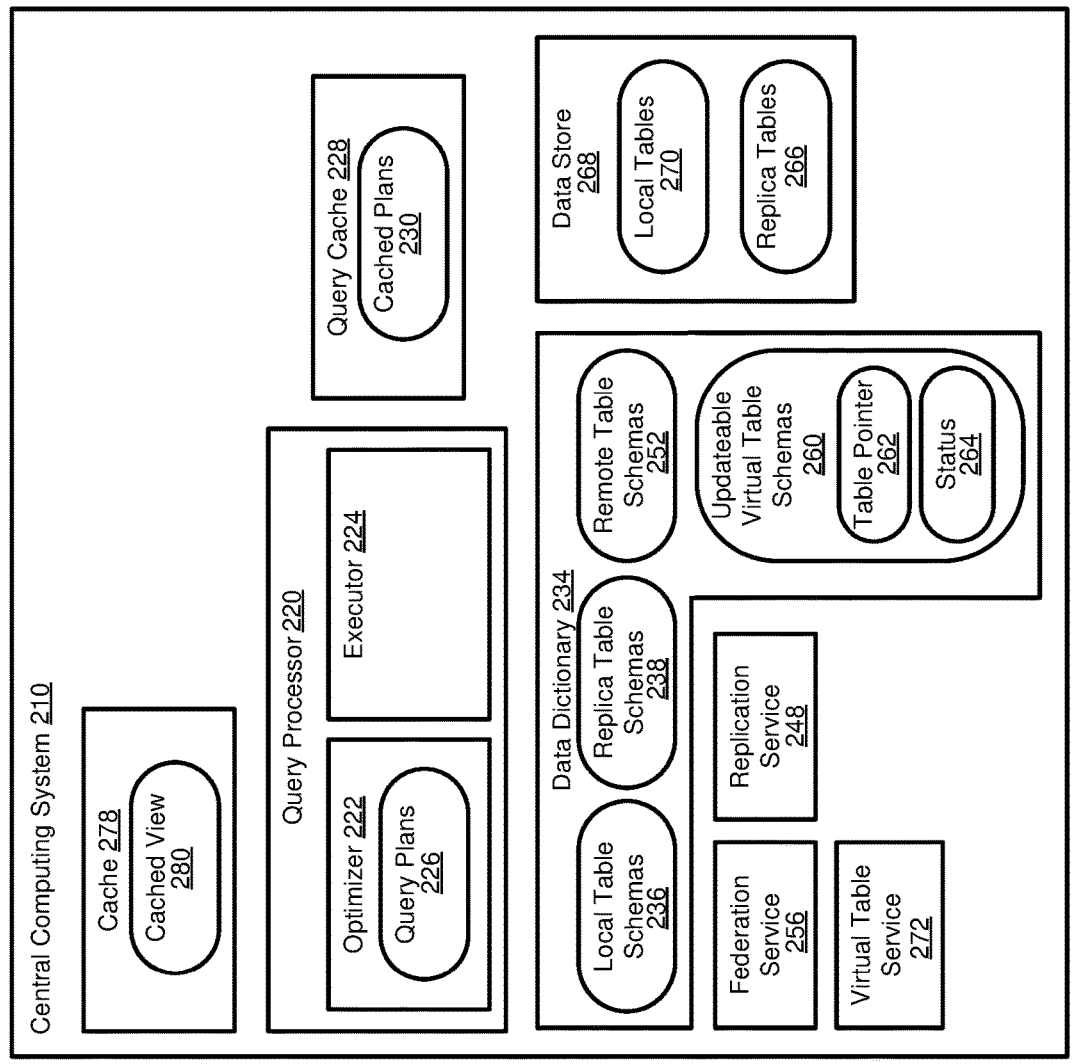
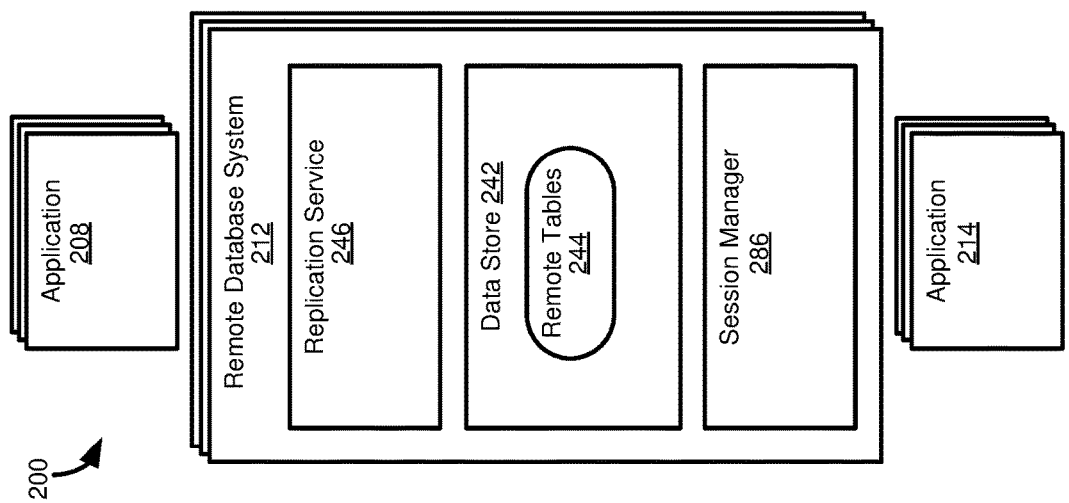
FIG 2

CHANGE-AWARE SNAPSHOT REPLICATION

FIELD

The present disclosure generally relates to data replication. Particular implementations relate to determining whether a source data object has changed relative to a target data object before replicating data from the source data object to the target data object.

BACKGROUND

It is increasingly common for enterprises to have data stored in a variety of systems, including in one or more local systems and in one or more cloud-based systems. The systems can be of different types—such as storing data in different formats (e.g., a relational database versus a database that stores JSON documents) or storing data using different database management systems (e.g., using software and/or hardware provided by different vendors). Even where data is stored in the same format and using software of the same vendor, differences can exist in what data is stored at a particular location and the schema used to store it.

In order to help address these issues, various techniques have been used, including data replication and database federation. In a federated database environment, requests for database operations, such as queries, can specify sources at a local database system or at a "remote" database accessed using data federation. In some cases, both local and remote data sources can be specified in the same query, such as having a query that retrieves data from a local database table and data from a data source of a remote, federated database system.

Data replication offers a strategic advantage for businesses by enabling a target system to access and utilize data originally residing in a source system, supplementing the information already natively stored within the target system itself. In this architecture, the source system essentially serves as a more authoritative or primary source of truth regarding the replicated data. This means that while the target system maintains its inherent data, it can also leverage additional information replicated from the source system to enhance its data processing or analytical capabilities. However, any discrepancies or conflicts involving the replicated data are typically resolved in favor of the source system, given its status as the higher source of truth.

For various reasons, such as query performance, data replication may be a better solution in some scenarios than data federation. However, often the data of the source system is not "static," in that data can be added to the source system, removed from the source system, or changed at the source system. Thus, rather than replicating data from the source system to the target system a single time, processes are implemented to update data at the target system based on changes made at the source system.

One way of performing these updates is to enable real-time replication, where changes at the source system are communicated to the target system as they are made at the source system, often using a log-based approach. While this can help ensure that the data in the target system is the same as the data in the source system, real-time replication processes can be complex and computationally expensive, both at the source system and at the target system. A particular disadvantage of log-based approaches is that both the source and target systems typically need to be tightly integrated. For example, a target system is typically designed based on an implementation of the source system, so the appropriate logs can be acquired and parsed. Often, this results in real-time replication being difficult to implement between systems of different vendors.

Thus, another type of replication that can be used is snapshot replication, where all or selected data sources, such as particular tables identified for replication, have their contents periodically sent to the target system so that the target system can have a more up to date version of the source system's data. However, because snapshot replication is not real-time replication, the target system's data can become out of date compared with the source system's data as time passes. In addition, performing a snapshot update can be computationally expensive, since typically all of the contents identified for replication at the source system are sent to the target system during a snapshot update. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed techniques and solutions can provide improved snapshot replication. Typically, an initial replica obtained using snapshot replication is periodically updated. However, the update process can unnecessarily consume computing resources if data in a source data object has not changed with respect to data in a replica data object. Disclosed techniques check to determine whether a snapshot replica is out of date before obtaining a new snapshot. The checks can be performed on manual request or on the occurrence of triggers, such as receiving a query that accesses the replica data object or according to a schedule. Information for current and prior versions of the remote data object can be compared to determine whether a replica is out of date, such as digest values of contents of the remote data object or timestamps associated with the remote data object.

In one aspect, the present disclosure provides a process of performing a snapshot replica update after determining that a current snapshot replica is out of date compared with a remote data object. At a local data source, a first instance of a first data object type is created. From a remote data source, a first set of data is received for the first instance of the first data object type. The first set of data is data extracted from a remote data object of the remote data source. The data is stored in the first instance of the first object type. It is determined that the first instance of the first object type is out of date compared with the remote data object. A second set of data is received for the first instance of the first data object type. The second set of data is updated data for the remote data object. At least a portion of the first set of data is replaced with data of the second set of data in the first instance of the first object type.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 2 is a diagram depicting a computing environment in which a database system can access data in a remote computing system using data federation, including through virtual tables, or using local tables having data replicated from the remote computing system.

DETAILED DESCRIPTION

Example 1—Overview

Figure 1:
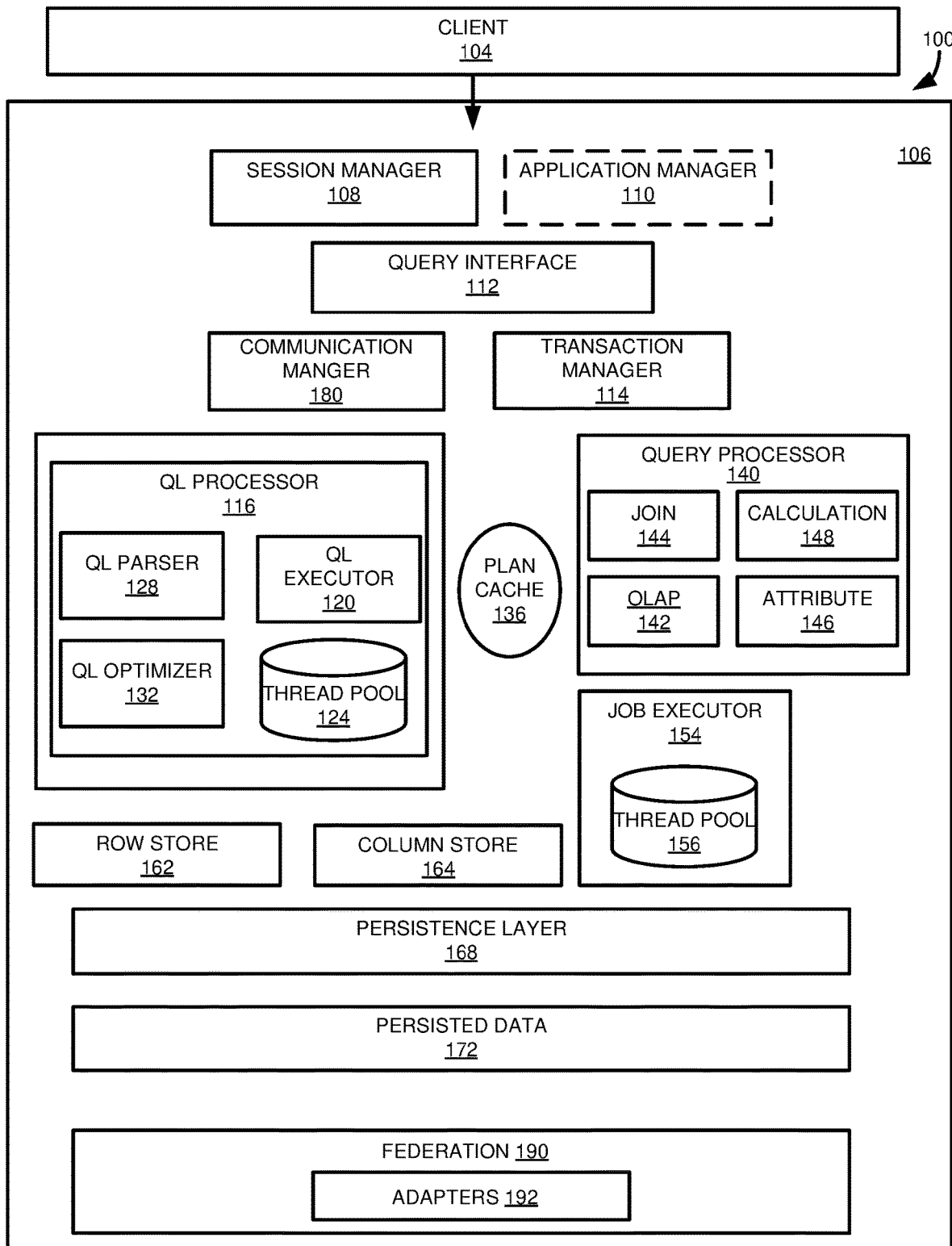
FIG. 1 is a diagram depicting an example database system which can be used in implementing aspects of disclosed technologies.

It is increasingly common for enterprises to have data stored in a variety of systems, including in one or more local systems and in one or more cloud-based systems. The systems can be of different types—such as storing data in different formats (e.g., a relational database versus a database that stores JSON documents) or storing data using different database management systems (e.g., using software and/or hardware provided by different vendors). Even where data is stored in the same format and using software of the same vendor, differences can exist in what data is stored at a particular location and the schema used to store it.

In order to help address these issues, various techniques have been used, including data replication and database federation. In a federated database environment, requests for database operations, such as queries, can specify sources at a local database system or at a "remote" database accessed using data federation. In some cases, both local and remote data sources can be specified in the same query, such as having a query that retrieves data from a local database table and data from a data source of a remote, federated database system.

Data replication offers a strategic advantage for businesses by enabling a target system to access and utilize data originally residing in a source system, supplementing the information already natively stored within the target system itself. In this architecture, the source system essentially serves as a more authoritative or primary source of truth regarding the replicated data. This means that while the target system maintains its inherent data, it can also leverage additional information replicated from the source system to enhance its data processing or analytical capabilities. However, any discrepancies or conflicts involving the replicated data are typically resolved in favor of the source system, given its status as the higher source of truth.

For various reasons, such as query performance, data replication may be a better solution in some scenarios than data federation. However, often the data of the source system is not "static," in that data can be added to the source system, removed from the source system, or changed at the source system. Thus, rather than replicating data from the source system to the target system a single time, processes are implemented to update data at the target system based on changes made at the source system.

One way of performing these updates is to enable real-time replication, where changes at the source system are communicated to the target system as they are made at the source system, often using a log-based approach. While this can help ensure that the data in the target system is the same as the data in the source system, real-time replication processes can be complex and computationally expensive, both at the source system and at the target system. A particular disadvantage of log-based approaches is that both the source and target systems typically need to be tightly integrated. For example, a target system is typically designed based on an implementation of the source system, so the appropriate logs can be acquired and parsed. Often, this results in real-time replication being difficult to implement between systems of different vendors.

Thus, another type of replication that can be used is snapshot replication, where all or selected data sources, such as particular tables identified for replication, have their contents periodically sent to the target system so that the target system can have a more up to date version of the source system's data. However, because snapshot replication is not real-time replication, the target system's data can become out of date compared with the source system's data as time passes. In addition, performing a snapshot update can be computationally expensive, since typically all of the contents identified for replication at the source system are sent to the target system during a snapshot update. Accordingly, room for improvement exists.

As a particular example of how a local database can access data at remote data sources, the SDA (Smart Data Access) data virtualization technology of SAP SE, of Walldorf, Germany, allows data in "virtual tables" of a local database system to access data replicated from a remote system to the local system, or to directly access data from the remote system through data federation. In some implementations, a given virtual table can be toggled between accessing data from a local replica or directly from a remote system. Although disclosed techniques can be used in SAP SDA, disclosed techniques can be used in other scenarios that involve snapshot (or "batch") replication from a remote system to a local system.

As discussed, snapshot replication can have lower overhead than real-time replication, but the process of performing a snapshot update can still be expensive, and data can become stale, depending on how frequently the data changes and how frequently, or if, an updated snapshot is obtained. Typically, snapshot updates are either manually requested, or are requested according to a schedule. A problem with manually requesting a snapshot update is that it requires affirmative action on the part of a user or computing process. Thus, for example, a user may need to consider before executing a query whether data from a remote data source may be out of date compared with when the last snapshot was taken. However, the user may forget to perform this action, resulting in query results that may have out of date data. Or, the user may request an update, and incur the resulting computing overhead, even though data at the source system has not changed compared with the current snapshot at the local system.

In other cases, snapshots can be periodically refreshed, such as according to a schedule. However, this can suffer from the same issues as manual triggering of a snapshot update. Updates can be performed before data has changed, or before a "significant" number of changes have occurred, incurring unnecessary computing costs, or queries can be executed against stale data before a scheduled update occurs.

The present disclosure provides techniques for improved snapshot replication. In particular, disclosed techniques allow for a current snapshot of replica data of a local system to be compared with a current state of the subject data at the remote system. Rather than directly comparing data from the remote and replica systems, summary data for the data at the remote system can be compared with summary data for data in a replica of a local system. If the comparison indicates that a change has occurred, the local system can obtain an updated replica from the remote system. Thus, snapshot updates are only performed when data has changed at the remote system.

The present disclosure provides specific examples of disclosed techniques implemented in a relational database system, such as being used in processes involving a local, replica database table and a remote database table. However, disclosed techniques can be used with other types of data objects, such as storing data in formats such as JSON, XML, CSV, PARQUEST, BSON (binary JSON), APACHE KAFKA, APACHE CASSANDRA, or as SAP BW objects.

In some cases, the remote and replica objects in which data is stored are of the same type, while in other cases the remote and replica objects can be of different types. As explained later in the disclosure, a characteristic or property of a first version of the remote data object (such as reflected in a replica) can be compared with the characteristic or property of a second version of the remote data object (such as reflected in a current version of the object of the remote system), where a change can be indicated, and an update process triggered, if values of the properties or characteristic differ. The characteristic or property need not be calculated from a replica object, provided that values of the characteristic or property of the version of the remote object used to generate or populate the replica object are available.

Various types of summary data can be used to determine whether data maintained at a remote system has changed as compared with data in a snapshot replica at a local system. In one embodiment, a hash value for a snapshot replica can be calculated and compared with a hash value of a current version of data at the remote system. In another embodiment, current table statistics for a table can be compared with table statistics associated with the snapshot replica. Other metadata regarding a particular data object can be used for comparison purposes, such as a date a table was last modified, or information regarding a size of the table.

Comparisons can be initiated and performed according to various criteria. In some cases, a comparison can be made when a query is received at the local system that requests data from the replica, or upon similar activities, such as upon a request for query plan compilation or re-compilation. In another example, comparisons can be made according to a schedule.

Comparison processes, and triggering of update processes, can be performed at the remote system or at the local system, depending on implementation. In the case of checking whether a replica is up to date upon a query request, the comparison process can be initiated by the local system. However, the local system could send data values to the remote system, where the remote system then determines whether the replica is up to date, or the local system could request values from (or the remote system could send values to) the remote system, and then the local system can determine whether the replica is up to date. In the case of other types of triggers, such as determining whether the replica is up to date according to a schedule, the check can be initiated at the remote system or at the local system.

The present disclosure generally proceeds with a discussion of determining whether a new snapshot replica should be obtained based on information for an overall data object, such as a relational database table. However, at least certain aspects of the disclosed techniques can be applied on a more granular level. For example, rather than determining whether contents of an entire table differ from a snapshot replica, it can be determined whether one or more particular columns of the snapshot replica have different properties than corresponding one or more columns of a current version of the remote data source used for the replica. Similarly, metadata for a column, such as a date modified or size, can be used in determining whether a snapshot replica should be updated, rather than (or in addition to) looking at data for a table overall.

Disclosed techniques can thus provide a number of advantages. By checking to see whether a snapshot replica is likely to differ from source data on a remote system, unnecessary data transmission and processing can be avoided as compared with a scenario where new snapshots are obtained according to a schedule or triggering event. Comparisons to determine changes, and obtain new snapshots, can be automated, which can free users from having to manually determine whether an updated snapshot should be obtained and cause the update process to be performed. Further, disclosed techniques provide flexibility in processing queries, such as allowing those submitting a query to indicate what action should be taken if it is determined that a snapshot replica may be out of date.

Example 2 describes an example database system that can be used in implementing disclosed technologies. Example 3 provides an example of a virtual table, where the virtual table includes a logical pointer that can be updated to point to different locations, including a location in a federated data source or in a local data source (including a local table, or a table maintained in a cache). Although, it should be appreciated that disclosed techniques need not use such virtual tables. That is, disclosed techniques can be applied to any implementation of a replica table that obtains data using snapshot replication. Examples 4-8 more specifically describe disclosed techniques for performing change-aware snapshot replication.

Example 2—Example Database Architecture

FIG. 1 illustrates an example database environment 100. The database environment 100 can include a client 104. Although a single client 104 is shown, the client 104 can represent multiple clients. The client or clients 104 may be OLAP clients, OLTP clients, or a combination thereof.

The client 104 is in communication with a database server 106. Through various subcomponents, the database server 106 can process requests for database operations, such as requests to store, read, or manipulate data (i.e., CRUD operations). A session manager component 108 can be responsible for managing connections between the client 104 and the database server 106, such as clients communicating with the database server using a database programming interface, such as Java Database Connectivity (JDBC), Open Database Connectivity (ODBC), or Database Shared Library (DBSL). Typically, the session manager 108 can simultaneously manage connections with multiple clients 104. The session manager 108 can carry out functions such as creating a new session for a client request, assigning a client request to an existing session, and authenticating access to the database server 106. For each session, the session manager 108 can maintain a context that stores a set of parameters related to the session, such as settings related to committing database transactions or the transaction isolation level (such as statement level isolation or transaction level isolation).

For other types of clients 104, such as web-based clients (such as a client using the HTTP protocol or a similar transport protocol), the client can interface with an application manager component 110. Although shown as a component of the database server 106, in other implementations, the application manager 110 can be located outside of, but in communication with, the database server 106. The application manager 110 can initiate new database sessions with the database server 106, and carry out other functions, in a similar manner to the session manager 108.

The application manager 110 can determine the type of application making a request for a database operation and mediate execution of the request at the database server 106, such as by invoking or executing procedure calls, generating query language statements, or converting data between formats useable by the client 104 and the database server 106. In particular examples, the application manager 110 receives requests for database operations from a client 104, but does not store information, such as state information, related to the requests.

Once a connection is established between the client 104 and the database server 106, including when established through the application manager 110, execution of client requests is usually carried out using a query language, such as the structured query language (SQL). In executing the request, the session manager 108 and application manager 110 may communicate with a query interface 112. The query interface 112 can be responsible for creating connections with appropriate execution components of the database server 106. The query interface 112 can also be responsible for determining whether a request is associated with a previously cached statement or a stored procedure, and calling the stored procedure or associating the previously cached statement with the request.

At least certain types of requests for database operations, such as statements in a query language to write data or manipulate data, can be associated with a transaction context. In at least some implementations, each new session can be assigned to a transaction. Transactions can be managed by a transaction manager component 114. The transaction manager component 114 can be responsible for operations such as coordinating transactions, managing transaction isolation, tracking running and closed transactions, and managing the commit or rollback of transactions. In carrying out these operations, the transaction manager 114 can communicate with other components of the database server 106.

The query interface 112 can communicate with a query language processor 116, such as a structured query language processor. For example, the query interface 112 may forward to the query language processor 116 query language statements or other database operation requests from the client 104. The query language processor 116 can include a query language executor 120, such as a SQL executor, which can include a thread pool 124. Some requests for database operations, or components thereof, can be executed directly by the query language processor 116. Other requests, or components thereof, can be forwarded by the query language processor 116 to another component of the database server 106. For example, transaction control statements (such as commit or rollback operations) can be forwarded by the query language processor 116 to the transaction manager 114. In at least some cases, the query language processor 116 is responsible for carrying out operations that retrieve or manipulate data (e.g., SELECT, UPDATE, DELETE). Other types of operations, such as queries, can be sent by the query language processor 116 to other components of the database server 106. The query interface 112, and the session manager 108, can maintain and manage context information associated with requests for database operation. In particular implementations, the query interface 112 can maintain and manage context information for requests received through the application manager 110.

When a connection is established between the client 104 and the database server 106 by the session manager 108 or the application manager 110, a client request, such as a query, can be assigned to a thread of the thread pool 124, such as using the query interface 112. In at least one implementation, a thread is associated with a context for executing a processing activity. The thread can be managed by an operating system of the database server 106, or by, or in combination with, another component of the database server. Typically, at any point, the thread pool 124 contains a plurality of threads. In at least some cases, the number of threads in the thread pool 124 can be dynamically adjusted, such as in response to a level of activity at the database server 106. Each thread of the thread pool 124, in particular aspects, can be assigned to a plurality of different sessions.

When a query is received, the session manager 108 or the application manager 110 can determine whether an execution plan for the query already exists, such as in a plan cache 136. If a query execution plan exists, the cached execution plan can be retrieved and forwarded to the query language executor 120, such as using the query interface 112. For example, the query can be sent to an execution thread of the thread pool 124 determined by the session manager 108 or the application manager 110. In a particular example, the query plan is implemented as an abstract data type.

If the query is not associated with an existing execution plan, the query can be parsed using a query language parser 128. The query language parser 128 can, for example, check query language statements of the query to make sure they have correct syntax, and confirm that the statements are otherwise valid. For example, the query language parser 128 can check to see if tables and records recited in the query language statements are defined in the database server 106.

The query can also be optimized using a query language optimizer 132. The query language optimizer 132 can manipulate elements of the query language statement to allow the query to be processed more efficiently. For example, the query language optimizer 132 may perform operations such as unnesting queries or determining an optimized execution order for various operations in the query, such as operations within a statement. After optimization, an execution plan can be generated, or compiled, for the query. In at least some cases, the execution plan can be cached, such as in the plan cache 136, which can be retrieved (such as by the session manager 108 or the application manager 110) if the query is received again.

For the purposes of the present disclosure, one task that can be performed by the query language optimizer 132 is determining a location where a request for a database operation, or a portion thereof, should be performed. For instance, a complex query may be submitted that reads data from multiple data sources. At least one of the data sources may be a virtual table, and the request can be performed on a replica table of the database server 106, or the request can be sent to a remote system via data federation, and results returned to the database server.

Once a query execution plan has been generated or received, the query language executor 120 can oversee the execution of an execution plan for the query. For example, the query language executor 120 can invoke appropriate subcomponents of the database server 106.

In executing the query, the query language executor 120 can call a query processor 140, which can include one or more query processing engines. The query processing engines can include, for example, an OLAP engine 142, a join engine 144, an attribute engine 146, or a calculation engine 148. The OLAP engine 142 can, for example, apply rules to create an optimized execution plan for an OLAP query. The join engine 144 can be used to implement relational operators, typically for non-OLAP queries, such as join and aggregation operations. In a particular implementation, the attribute engine 146 can implement column data structures and access operations. For example, the attribute engine 146 can implement merge functions and query processing functions, such as scanning columns.

In certain situations, such as if the query involves complex or internally parallelized operations or sub-operations, the query executor 120 can send operations or sub-operations of the query to a job executor component 154, which can include a thread pool 156. An execution plan for the query can include a plurality of plan operators. Each job execution thread of the job execution thread pool 156, in a particular implementation, can be assigned to an individual plan operator. The job executor component 154 can be used to execute at least a portion of the operators of the query in parallel. In some cases, plan operators can be further divided and parallelized, such as having operations concurrently access different parts of the same table. Using the job executor component 154 can increase the load on one or more processing units of the database server 106, but can improve execution time of the query.

The query processing engines of the query processor 140 can access data stored in the database server 106. Data can be stored in a row-wise format in a row store 162, or in a column-wise format in a column store 164. In at least some cases, data can be transformed between a row-wise format and a column-wise format. A particular operation carried out by the query processor 140 may access or manipulate data in the row store 162, the column store 164, or, at least for certain types of operations (such a join, merge, and subquery), both the row store 162 and the column store 164. In at least some aspects, the row store 162 and the column store 164 can be maintained in main memory.

A persistence layer 168 can be in communication with the row store 162 and the column store 164. The persistence layer 168 can be responsible for actions such as committing write transactions, storing redo log entries, rolling back transactions, and periodically writing data to storage to provided persisted data 172.

In executing a request for a database operation, such as a query or a transaction, the database server 106 may need to access information stored at another location, such as another database server. The database server 106 may include a communication manager 180 component to manage such communications. The communication manger 180 can also mediate communications between the database server 106 and the client 104 or the application manager 110, when the application manager is located outside of the database server.

In some cases, the database server 106 can be part of a distributed database system that includes multiple database servers. At least a portion of the database servers may include some or all of the components of the database server 106. The database servers of the database system can, in some cases, store multiple copies of data. For example, a table may be replicated at more than one database server. In addition, or alternatively, information in the database system can be distributed between multiple servers. For example, a first database server may hold a copy of a first table and a second database server can hold a copy of a second table. In yet further implementations, information can be partitioned between database servers. For example, a first database server may hold a first portion of a first table and a second database server may hold a second portion of the first table.

In carrying out requests for database operations, the database server 106 may need to access other database servers, or other information sources, within the database system, or at external systems, such as an external system on which a remote data object is located. The communication manager 180 can be used to mediate such communications. For example, the communication manager 180 can receive and route requests for information from components of the database server 106 (or from another database server) and receive and route replies.

The database server 106 can include components to coordinate data processing operations that involve remote data sources. In particular, the database server 106 includes a data federation component 190 that at least in part processes requests to access data maintained at a remote system. In carrying out its functions, the data federation component 190 can include one or more adapters 192, where an adapter can include logic, settings, or connection information usable in communicating with remote systems, such as in obtaining information to help generate virtual parameterized data objects or to execute requests for data using virtual parameterized data objects (such as issuing a request to a remote system for data accessed using a corresponding parameterized data object of the remote system). Examples of adapters include "connectors" as implemented in technologies available from SAP SE, of Walldorf, Germany. Further, disclosed techniques can use technologies underlying data federation techniques such as Smart Data Access (SDA) and Smart Data Integration (SDI) of SAP SE.

Example 3—Example Virtual Tables, Including with Updatable Logical Pointers

FIG. 2 illustrates a computing environment 200 in which disclosed embodiments can be implemented. The basic computing environment 200 of FIG. 2 includes a number of features that can be common to different embodiments of the disclosed technologies, including one or more applications 208 that can access a central computing system 210, which can be a cloud computing system. The central computing system 210 is shown as a monolithic/unitary system, but it should be appreciated that, particularly in a cloud environment, the central computing system can include a number of computing systems that function together as a single system. For example, the central computing system 210 can be implemented as a plurality of "nodes," including an anchor node and zero or more non-anchor nodes. A central computing system 210 can also be a more typical "distributed" database system, which includes a master node and one or more worker nodes.

The central computing system 210 can act as such by providing access to data stored in one or more remote database systems 212. In turn, the remote database systems 212 can be accessed by one or more applications 214. In some cases, an application 214 can also be an application 208. That is, some applications may only (directly) access data in the central computing system 210, some applications may only access data in a remote database system 212, and other applications may access data in both the central computing system and in a remote database system.

The central computing system 210 can include a query processor 220. The query processor 220 can include multiple components, including a query optimizer 222 and a query executor 224. The query optimizer 222 can be responsible for determining a query execution plan 226 for a query to be executed using the central computing system 210. The query plan 226 generated by the query optimizer 222 can include both a logical plan indicating, for example, an order of operations to be executed in the query (e.g., joins, projections) and a physical plan for implementing such operations. Once developed by the query optimizer 222, a query plan 226 can be executed by the query executor 224. Query plans 226 can be stored in a query plan cache 228 as cached query plans 230. When a query is resubmitted for execution, the query processor 220 can determine whether a cached query plan 230 exists for the query. If so, the cached query plan 230 can be executed by the query executor 224. If not, a query plan 226 is generated by the query optimizer 222. In some cases, cached query plans 230 can be invalidated, such as if changes are made to a database schema, or at least components of a database schema (e.g., tables or views) that are used by the query.

A data dictionary 234 (which can also be referred to as a system catalog) can maintain one or more database schemas for the central computing system 210. In some cases, the central computing system 210 can implement a multitenant environment, and different tenants may have different database schemas. In at least some cases, at least some database schema elements can be shared by multiple database schemas.

The data dictionary 234 can include definitions (or schemas) for different types of database objects, such as schemas for tables or views. Although the following discussion references tables for ease of explanation, it should be appreciated that the discussion can apply to other types of database objects, particularly database objects that are associated with retrievable data, such as materialized views. A table schema can include information such as the name of the table, the number of attributes (or columns or fields) in the table, the names of the attributes, the data types of the attributes, an order in which the attributes should be displayed, primary key values, foreign keys, associations to other database objects, partition information, or replication information.

Table schemas maintained by the data dictionary 234 can include local table schemas 236, which can represent tables that are primarily maintained on the central computing system 210. The data dictionary 234 can include replica table schemas 238, which can represent tables where at least a portion of the table data is stored in the central computing system 210 (or which is primarily managed by a database management system of the central computing system, even if stored other than on the central computing system, such as being stored in a data lake or in another cloud service). Tables having data associated with replica tables schemas 238 typically will periodically have their data updated from a source table, such as a remote table 244 of a data store 242 of a remote database system 212.

Replication can be accomplished using one or both of a replication service 246 of the remote database system 212 or a replication service 248 of the central computing system 210. In particular examples, the replication service can be the Smart Data Integration (SDI) service, SAP Landscape Transformation Replication Server, SAP Data Services, SAP Replication Server, SAP Event Stream Processor, or an SAP HANA Direct Extractor Connection, all of SAP SE, of Walldorf, Germany. As discussed, replication can use a real-time replication technique, or can use snapshot/batch replication.

In some cases, data in a remote database system 212 can be accessed by the central computing system 210 without replicating data from the remote database system, such as using federation techniques. The data dictionary 234 can store virtual table schemas 252 for virtual tables that are mapped to remote tables, such as a remote table 244 of a remote database system 212. Data in the remote table 244 can be accessed using a federation service 256, such as using the Smart Data Access protocol of SAP SE, of Walldorf, Germany. The federation service 256 can be responsible for converting query operations into a format that can be processed by the appropriate remote database system 212, sending the query operations to the remote database system, receiving query results, and providing the query results to the query executor 224.

The data dictionary 234 can include updatable virtual table schemas 260 that have updatable logical pointers 262. The updated virtual table schemas 260 can optionally be associated with status information 264. The table pointer 262 can be a logical pointer used to identify what table should be accessed for data of the corresponding virtual table schema 260. For example, depending on the state of the table pointer 262, the table pointer can point to the remote table 244 of a remote database system 212 or a replica table 266 (which can be generated from the remote table 244) located in a data store 268 of the central computing system 210. The data store 268 can also store data for local tables 270, which can be defined by the local table schemas 236.

The table pointer 262 can be changed between the remote table 244 and the replica table 266. In some cases, a user can manually change the table pointed to by the table pointer 262. In other cases, the table pointer 262 can be automatically changed, such as in response to the detection of defined conditions.

The status information 264 can include an indicator identifying a virtual table schema 260 as being associated with a remote table 244 or a replica table 266. The status information 264 can also include information about the replication status of a replica table 266. For example, once a request is made to change the table pointer 262 to point to a replica table 266, it may take time before the replica table is ready for use. The status information 264 can include whether a replication process has been started, has been completed, or a progress status of generating the replica table 266.

Changes to updateable virtual table schemas 260 and managing replica tables 266 associated with virtual table schemas can be managed by a virtual table service 272. Although shown as a separate component of the central computing system 210, the virtual table service 272 can be incorporated into other components of the central computing system 210, such as the query processor 220 or the data dictionary 234.

When a query is executed, the query is processed by the query processor 220, including executing the query using the query executor 224 to obtain data from one or both of the data store 242 of the remote database system 212 or the data store 268 of the central computing system 210. Query results can be returned to the application 208. Query results can also be cached, such as in a cache 278 of the central computing system 210. The cached results can be represented as cached views 280 (e.g., materialized query results).

The applications 214 can access data in the remote database system 212, such as through a session manager 286. The applications 214 can modify the remote tables 244. When a table pointer 262 of an updateable virtual table schema 260 references a remote table 244, changes made by the applications 214 are reflected in the remote table. When a table pointer 262 references a replica table 266, changes made by the applications 214 can be reflected in the replica table using the replication service 246 or the replication service 248.

Example 4—Example Replication Techniques

Figure 3:
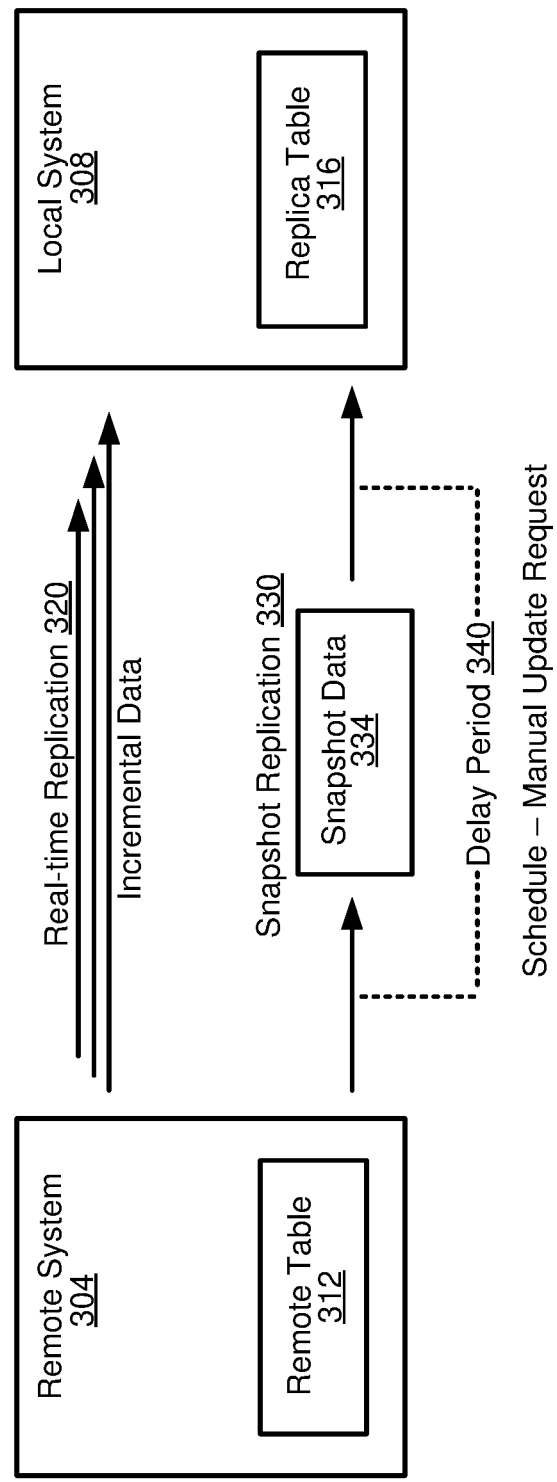
FIG. 3 is a diagram illustrating prior art data replication techniques.

FIG. 3 illustrates prior art techniques for replicating data from a remote system 304 to a local system 308. The remote system 304 includes a remote table 312. Data from the remote table 312 is replicated to a replica table 316 of the local system 308.

Data from the remote table 312 can be replicated to the replica table 316 in a number of ways. A real-time replication process 320 sends incremental data changes made to the remote table 312 to the replica table 316 as they occur, such as using techniques that can include change data capture or trigger-based replication. As mentioned in Example 1, while real-time replication can be advantageous in helping to ensure the replica table 316 is up to date with respect to the remote table 312, it can be complex to implement and require significant amounts of computing resource.

FIG. 3 also illustrates a snapshot replication process 330. In the snapshot replication process 330, a snapshot 334 of the remote table 312 is periodically obtained. Typically, the snapshot 334 includes all of the data of the remote table 312 at the point in time when the snapshot was taken. The snapshot data 334 can be sent to the local system 308. The current replica table 316 can be replaced with the snapshot data 334.

As shown, snapshots are typically obtained periodically, and thus the process 330 can be referred to as periodic replication. Since the replication is periodic, a new snapshot 334 is obtained after a delay period 340. The delay period 340 can be a delay according to a schedule, event, or a delay between manual update requests. As mentioned in Example 1, snapshot replication can be simpler to implement, and can be less resource-intensive than real-time replication, but the presence of the delay period 340 can cause queries at the local system 308 to retrieve data that is out of date compared with a current version of the remote table 312.

Example 5—Example Snapshot Replication with Update Check

Figure 4:
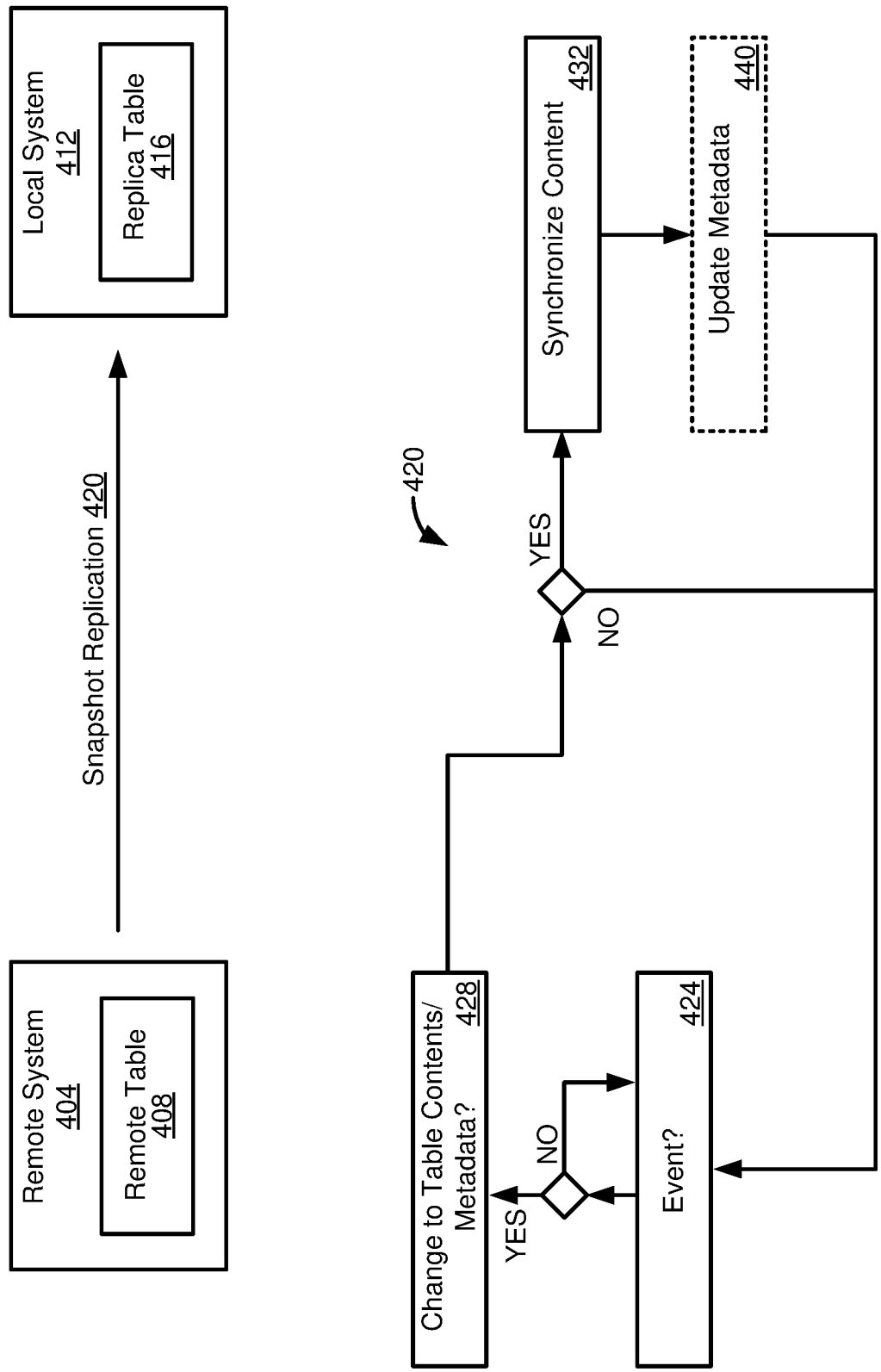
FIG. 4 is a diagram and a flowchart of a snapshot replication process according to the present disclosure.

FIG. 4 illustrates a snapshot replication process according to the present disclosure. Like FIG. 3, FIG. 4 includes a remote system 404 that has a remote table 408, and a local system 412 that has a local, replica table 416 that is a snapshot of the remote table 408 at a particular point in time. A snapshot replication process 420 is used to replicate data from the remote table 408 to the replica table 416.

FIG. 4 illustrates details of the snapshot replication process 420. The snapshot replication process 420 can begin at 424, where it is determined whether a particular event has occurred that causes the process to further proceed. Examples of events can be a request, such as from a user or application process, to determine whether the local table 416 should be updated with a more recent snapshot of the remote table 408, a schedule event, such as a particular instance of a particular date/time trigger or the passage of time according to a schedule (such as to determine every hour whether a snapshot should be updated), the receiving of a query involving the local table 416, or an indication that data of the remote table 408 has changed.

If it is determined at 424 that an event has not occurred, the process 420 can return to 424 until it is determined that an event has occurred. If it is determined at 424 that an event has occurred, the process 420 can proceed to 428. At 428, it is determined whether data in the replica table 416 is still consistent with data in the remote table 408. Performing a comparison of the actual data in both remote table 408 and the replica table 416 would be expensive, for resources needed to copy data, transmit data, and compare data, such that it may be more efficient to simply perform a snapshot update. Thus, the comparison at 428 typically considers information about the remote table 408 and the replica table 416, but does not compare all of the data of both tables. Details about what types of data may be compared at 428 are discussed in Example 7.

If it is determined at 428 that the replica table 416 is consistent with the remote table 408, as least based on the comparison criteria, the process 420 can return to 424. If is determined at 428 that the replica table 416 is not consistent with the remote table 408, the content of the tables can be synchronized at 432. Synchronizing content at 432 can include replacing the data in the replica table 416 with data from a new snapshot of contents of the remote table 408.

Optionally, at 440, metadata for the remote table 408, metadata for the replica table 416, or metadata for both tables can be updated. Updating metadata at 440 can include updating values used for the comparison at 428. For example, a new hash value, last modified date, table size, or set of statistics for the replica table 416 can be stored (corresponding to metadata of the remote table 408 at the time of the snapshot).

Example 6—Example Query Processing with Update Check and Optional Customized Processing As explained in Example 1, in some cases a query request that includes access to a local, replica table can trigger a check to determine whether a snapshot replica is up to date according to particular criteria, such as corresponding to an event 424 of the process 420 of FIG. 4. Typically, if no change is detected, the query can execute using the current snapshot replica. However, different processes can be implemented if it is determined that the snapshot replica is out of date.

If it is determined that a snapshot replica is out of date, the query can be executed using the current snapshot replica, even though some of the data accessed by the query may be out of date. As another option, if is determined that a snapshot replica is out of date, the query can be rejected, or the query can be queued pending the completion of a snapshot update. A given behavior can be "hardcoded" into a system, or default behavior can be specified, but where the default behavior can be selectively overridden.

In a particular example, the particular query can directly specify a desired behavior. That is the query can include a "hint," such as a keyword that indicates to a query executor or a query optimizer what behavior is desired. A query hint can indicate that the query should be executed without delay on a current version of the snapshot replica, even though data may be out of date as compared with the remote table.

A query hint can instead indicate that query processing should be delayed until an update snapshot is obtained. In a further example, a query hint can be used to indicate that the query should be executed using the remote table instead of the snapshot replica, such as using data federation techniques. In yet another example, a query hint can specify that a failure message should be returned if the snapshot is not up to date.

Figure 5:
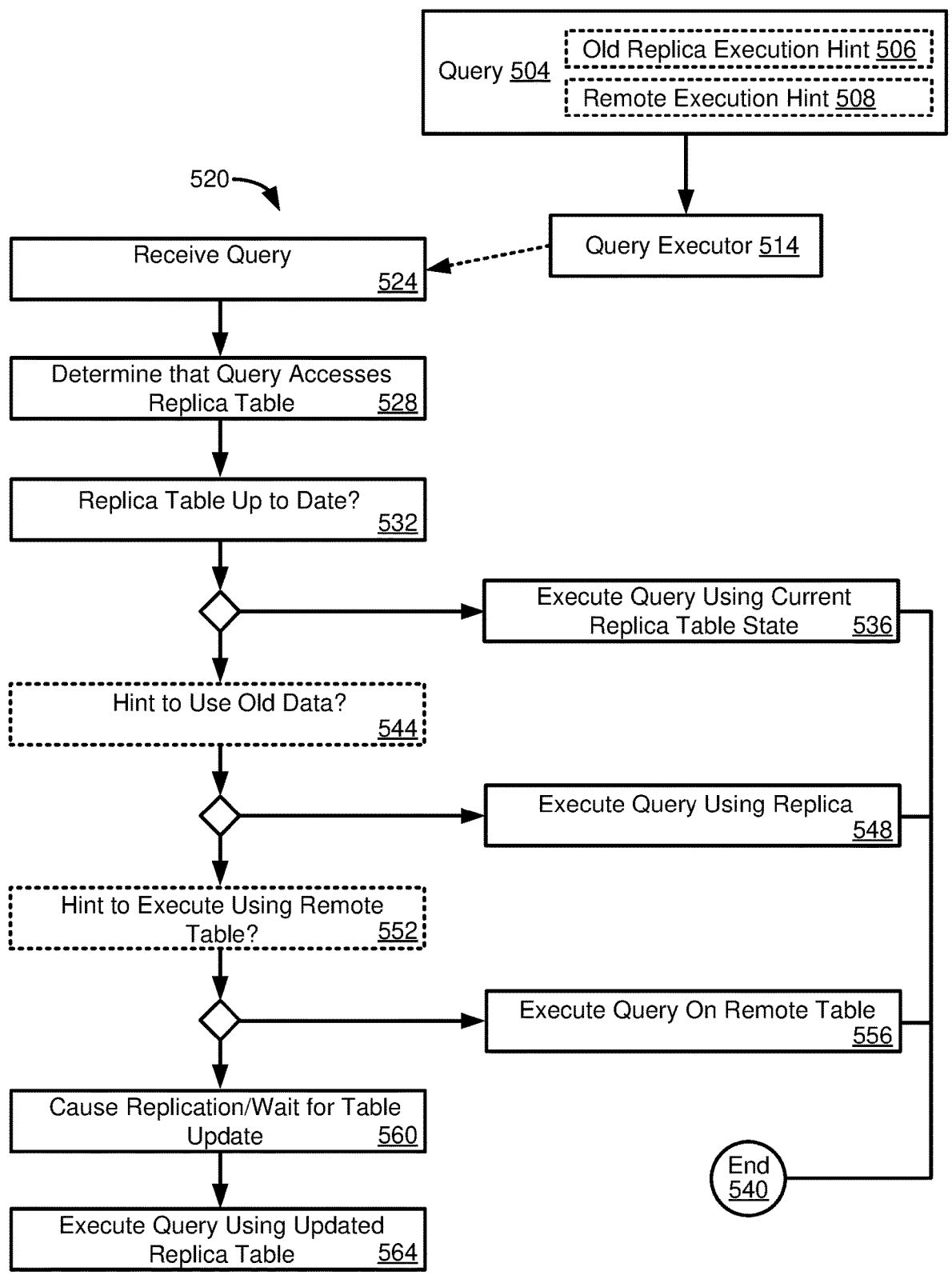
FIG. 5 is a flowchart of a disclosed process of executing a query that include hints as to preferred behavior if it is determined that a snapshot replica is out of date.

FIG. 5 illustrates an example process 520 where a query executor 514 executes a query 504 based on default behavior or using non-default behavior if a query hint is provided. Although described as being performed by a query executor, at least some operations of the process 520 can be performed by a query optimizer.

A query is received at 524. It is determined at 528 that the query accesses a replica table. At 532, a check is performed to determine whether the replica table is up to date with respect to a remote table. If so, the query is executed at 536 using the current replica table, and the process 520 can end at 540.

If it is determined at 532 that the replica table is not up to date, a check is performed at 544 to determine whether the query 504 includes a hint 506, indicating that the query should be executed on the current version of the replica table, rather than a default behavior of waiting until an updated snapshot is obtained. If it is determined at 544 that the query 504 includes the hint 506, the query is processed at 548 using the existing replica, and the process 520 can then end at 540.

If it is determined at 544 that the query 504 does not include the hint 506, it is determined at 552 if the query includes a hint 508, indicating that the query should be executed on the remote table if the local replica table is out of date. If the hint 508 is present, the query is executed, using the remote table, at 556, and the process 520 can end at 540.

If it is determined at 552 that the query 504 does not include the hint 508, the query can be queued at 560 until the local replica table is updated. Once the local replica table is updated, the query 504 can be executed at 564, and the process 520 can end at 540.

Note that the process 520 is just one example of how disclosed technologies can be used. In other implementations, checks for only hint 506 or hint 508 are implemented, and the database system may only support hint 506 or hint 508. Similarly, in the process 520, the default behavior is to delay query execution until an updated snapshot is obtained for the replica table. However, a process can have default behavior to execute a query using a current, outdated replica, and hints can be used to determine whether instead execution should be delayed pending an update or if federated query execution should be used, using the remote table. Another process can have default behavior to use federated query execution using the remote table if the local replica table is out of date, and hints can be used to determine if instead execution could be performed on the local system after an update snapshot is received, or if the query should be executed on the local system using a current, but outdated, replica table.

Figure 6:
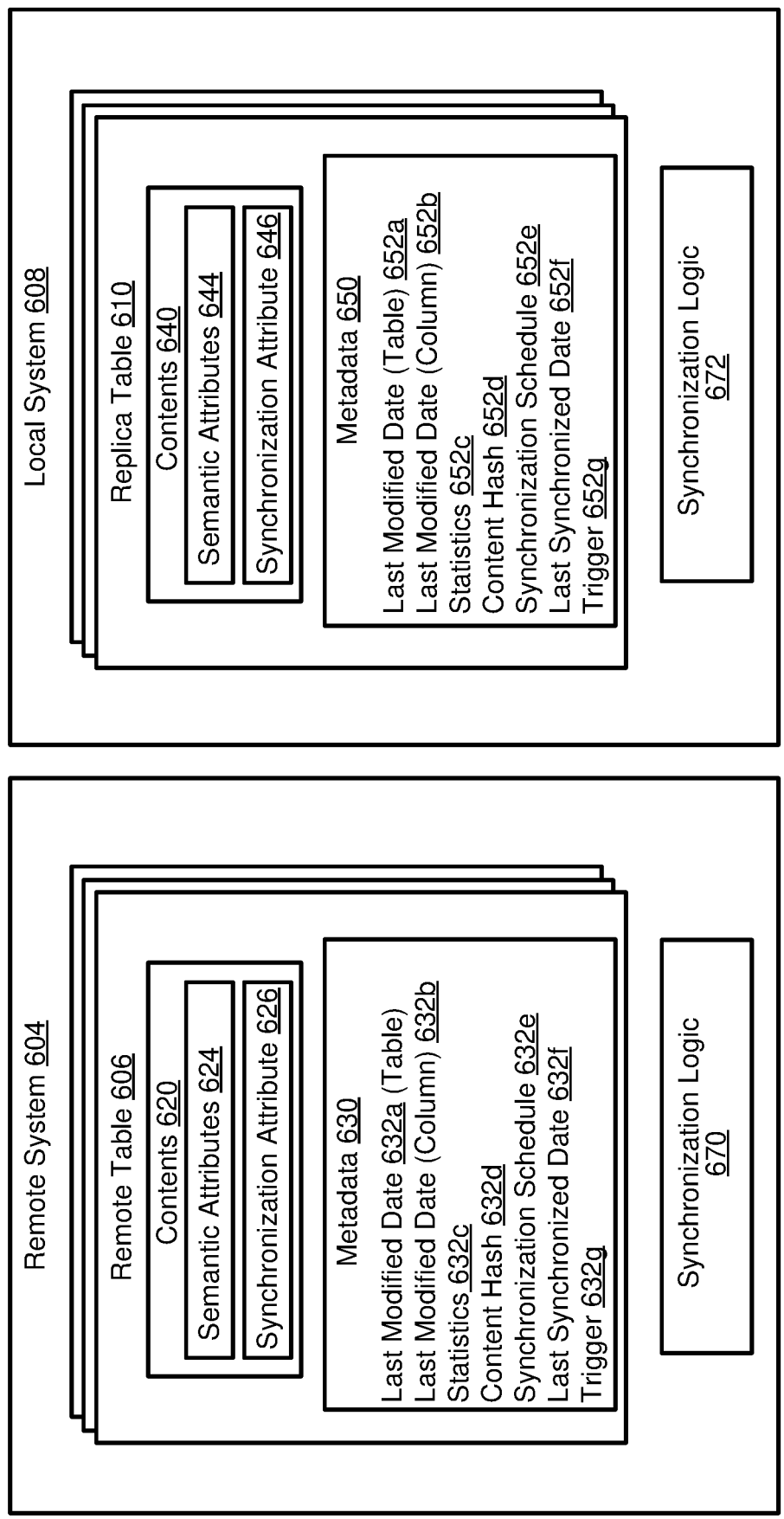
FIG. 6 is a diagram illustrating a remote table and a replica table and data elements that can be used to determine whether the replica table is up to date with respect to the remote table.

Example 7—Example Elements for Determining Whether Two Data Objects Differ or Triggering Update Analysis Process FIG. 6 illustrates various table properties that can be used in determining whether a replica table is up to data as compared with a remote table from which data is replicated to the replica table. FIG. 6 includes a remote system 604 with a remote table 606 and a local system 608 with a replica table 610 that corresponds to a snapshot of the remote table.

The remote table 606 is shown as having contents 620. The contents 620 can include one or more semantic attributes 624 and one or more synchronization attributes 626. Semantic attributes 624 provide data "about" a particular entity represented as an entry in the remote table 606. For example, entries in the remote table 606 might correspond to employees, customers, or sales transactions. In the case of an employee, semantic attributes 624 could include attributes such as a name, an employee identification number, an address, a job title, or a payrate.

Synchronization attributes 626 are attributes specifically used, or useable, to determine whether data in the remote table 606 differs from data in the replica table 610. Synchronization attributes 626 can, but need not be, semantic attributes 624. A particular example of a synchronization attribute 626 is a timestamp, such as a timestamp indicating when a particular row of the table was last added, deleted, or modified. Contents 640 of the replica table 610 can include semantic attributes 644 and synchronization attributes 646 that correspond to the semantic attributes 624 and 626, although the values of the attributes may differ between the tables 606, 610 if the replica table is not up to date with the remote table. The replica table 610 can include the last modified data as a synchronization attribute 644, where the value corresponds to the last modified date of the remote table 606 at the time of the most recent snapshot. Thus, determining whether the replica table 610 is out of date can be performed by querying the remote table 606 to determine if the remote table contains a record having a value of the timestamp synchronization attribute 626 that is later than a most recent value reflected in the timestamp synchronization attribute 646 of the replica table 610.

Rather than having "last modified" dates as a synchronization attribute 626, an overall last modified date 632a for the remote table 606 can be stored in metadata 630 associated with the remote table and having metadata elements 632 (shown as 632a-632g). The replica table 608 includes metadata 650, having metadata elements 652 (shown as metadata elements 652a-652g) and can include the last modified date 652a associated with the remote table 606 during the most recent snapshot. When a request is made to check whether the remote table 606 has changed with respect to the replica table 610, the metadata 630 can be queried to determine whether the last modified date 632a is the same as the last modified date 652a of the metadata 650. If the values are not the same, an updated replica can be obtained.

As has been previously described, in some scenarios, determining whether a new snapshot should be obtained for the replica table 610 can be performed on a more granular basis than the overall remote table 606. For example, it may be that changes to some semantic attributes 624 of the remote table 606 are of more concern than others. In this case, it may be desirable to update a snapshot when a semantic attribute 624 of particular concern has been changed as compared with the corresponding semantic attribute 644 of the replica table 610. Thus, the metadata 630 can include a last modified date 632b for specific semantic attributes 624 (such as a particular column of the remote table 606), and the metadata 650 of the replica table 610 can include a last modified date 652b for the corresponding semantic attribute 646. A determination of whether the replica table 610 is current can then be performed by determining whether the last modified date 632b for a given semantic attribute 624 is the same as the last modified date 652*b* of the corresponding semantic attribute 644.

Table statistics 632*c* of the remote table 606, reflected in the metadata 630, can also be used to determine when the remote table may have contents that differ from those in the replica table 610. While the metadata 630 stores current statistics, the metadata 650 of the replica table 610 includes statistics 652*c* copied from the metadata 630 when the last snapshot update occurred. While any suitable type of table statistics 632*c* can be used, examples of table statistics include:

---

Table size: The size of the table in memory, which can include memory for table data as well as memory used for structures such as indexes or system administration.
Record Count: The number of records (rows) in the table. Average record length can also be tracked.
Column Statistics: Information about data stored in each column (attribute) of the table, such as number of distinct values, maximum and minimum values, most common values, null counts, and average data sizes.
Partition Information: Information about how tables are partitioned, which can include a number of partitions and a number of rows or columns in each partition, or an overall size (memory or disk) of each partition.
Index Statistics: Information such as index identifiers, index size, and number of leaf nodes in an index.
Histograms: Information about distribution statistics of column values.
Size on Disk/Clustering Information: Information about the size on disk of a particular table and information about which rows that have similar column values are stored near each other on disk.

---

Note that certain table statistics 632*c* may have a dependency on the remote system 604. For example, information about memory use, particularly for indexes or system administration, can be specific to an implementation of the remote system 604, and the local system 608 may not have the same memory use, even if the data in the replica table 610 is identical to that of the remote table 606. However, this does not prevent the statistics 632*c* from being used to determine whether the replica table 610 may be out of date, since the comparison is between two states of the remote table 606 at the remote system 604, not between actual statistics of the replica table 610 and statistics of the remote table 606. In other words, such metadata 650 corresponds to the metadata 630 at the time of a snapshot.

Contents of the remote table 606 can be used in comparing table states in other ways. For example, contents of the remote table 606 (that is, actual values stored in the remote table according to a definition of the remote table) can be provided as input to a hash algorithm to produce a hash value 632*d*. This hash value 632*d* can be provided to the local system 608 and stored as a hash value 652*d* in the metadata 650. When it is to be determined whether the replica table 610 has the same contents as the remote table 606, a current hash value 632*d* of the remote table can be compared with the hash value 652*d* of the most recent snapshot replica used for the replica table.

The current hash value 632 of the remote table 606 can be determined (calculated) at various times, depending on particular implementation decisions. For example, the hash value 632*d* can be determined upon request of the local system 608, such as part of a process to check whether an updated snapshot replica should be obtained. In other cases, the hash value 632*d* can be periodically updated at the remote system 604, including when changes occur to the remote table 606, although that may involve significant overhead for tables with frequently changing data. On the other hand, periodic updates of the hash value 632*d* may be sufficient, although it can produce a risk of a "false negative" indication that the replica table 610 does not differ from the remote table 606, if the remote table in fact has changed, but an updated hash value has not yet been calculated.

Although the discussion uses the example of hash algorithms and hash functions, similar types of techniques can be used, including those that are less computationally expensive, such as using checksums. As with the hash value, in at least some cases, a checksum can be calculated using the entire contents of the remote table 606. Hash values and checksums are examples of a more general category of digests or digest values, where other types of digests may also be used in disclosed techniques. In addition, although hash values and checksums can be calculated on table contents as represented in the table, they can optionally be computed in another way, such as on a binary representation of the table contents.

One or both of the metadata 630 or the metadata 650 can include a synchronization schedule 632*e*, 652, that can be used, respectively, by synchronization logic 670 of the remote system 604 or by synchronization logic 672 of the local system 608. More typically, the metadata 650 includes the synchronization schedule 652*e*, and a check to determine whether an updated snapshot replica should be obtained is performed according to the schedule. In another implementation, the remote system 604 can periodically send update snapshot replicas to the local system 608, such as according to the schedule 632*e* of the metadata 630. A schedule can be expressed in various ways, such as specifying that a check for whether a new snapshot replica should be obtained at specific dates/times, should be conducted according to a periodic schedule (such as every hour, or every day), or performing checks within a specified window, such as using one or both of a "not later than" date or a "not earlier than" date. Synchronization (or, more specifically, a check to determine whether synchronization should be performed) can also be carried out upon demand, including based on a last synchronization date 632*f*, 652*f* of the metadata 630, 650. For example, a command can be "synchronize if LAST_SYNC_DATE>1 day".

The metadata 630 or the metadata 650 can also include triggers 632*g*, 652*g*. In this case "trigger" does not refer to trigger-based database processes, such as trigger-based updates or replication. Rather, "trigger" refers to some other event that causes a determination to be made whether the replica table 610 is consistent with the remote table 606. A synchronization schedule or performing a check when a query is received that includes operations on the replica table 610 could be considered as examples of triggers 632*g*, 652*g*, although they have been separated enumerated and described in this discussion. Other examples of triggers 632*g*, 653*g* could be a threshold number of changes being made to the remote table 606 or a threshold number of queries being received that access the replica table 610. Such triggers 632g, 652g can introduce a dynamic aspect to determining whether a replica update should be performed, as compared with a static schedule, since updates checks can occur frequently if there are more updates to the remote table 606 (indicating that the replica table 610 may be more significantly out of date) or if there is greater activity for the replica table (indicating that the replica table may be of higher interest, and thus prioritized for update checks as compared with "cold" data).

While the specification, including this Example 7, generally describes sending a copy of the entire contents of the remote table 606 when it is determined that the contents are different than the replica table 610, in other cases less than all of the data can be sent, such as data that has been added since a last replica snapshot was obtained. As a particular example, tables can be specified as append only. For these types of data, only rows appended after the date of the last replica snapshot need be sent to the local system 608.

Example 8—Example Operations

Figure 7:
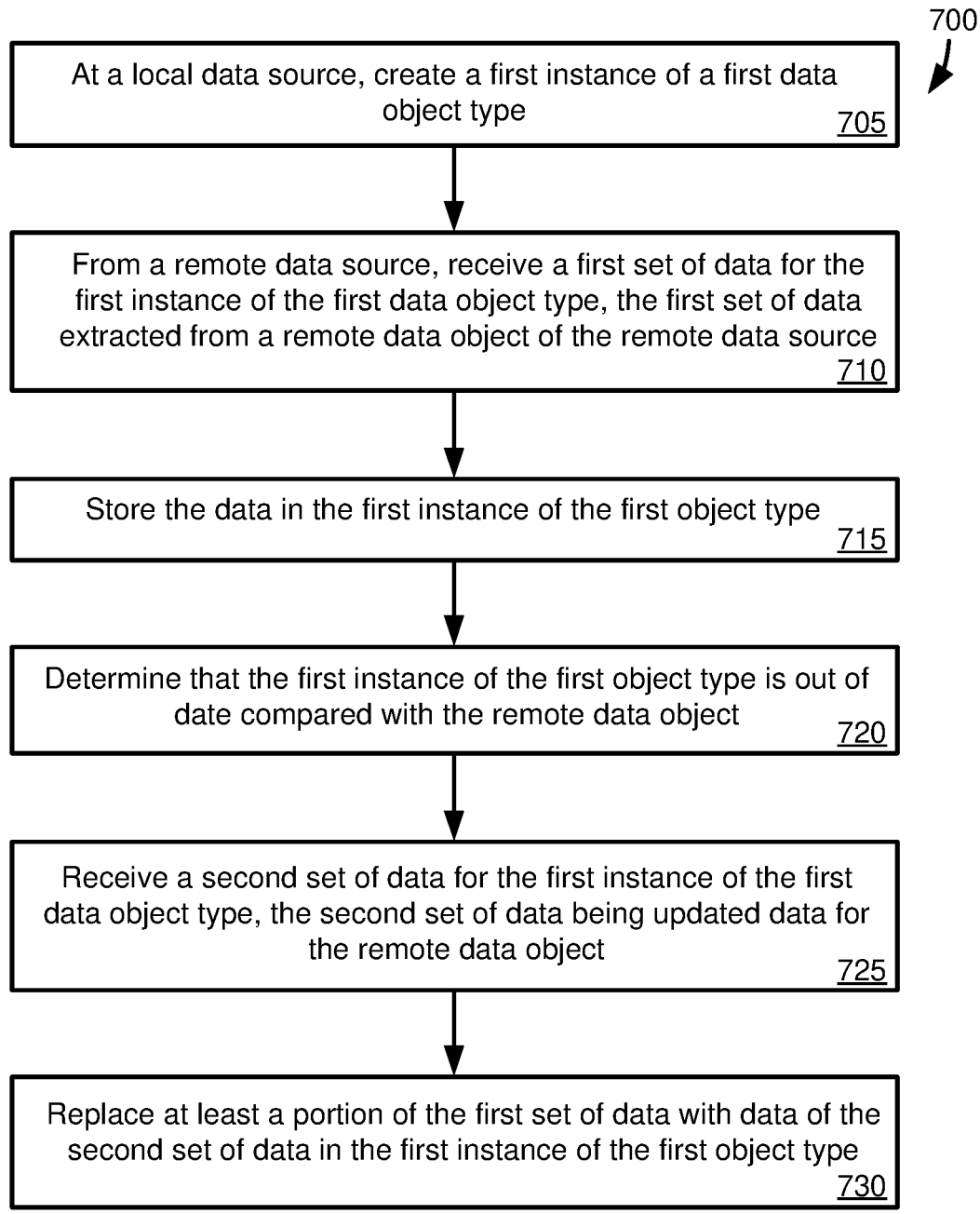
FIG. 7 is a flowchart of a process of performing a snapshot replica update after determining that a current snapshot replica is out of date compared with a remote data object.

FIG. 7 is a flowchart of a process 700 of performing a snapshot replica update after determining that a current snapshot replica is out of date compared with a remote data object. At 705, at a local data source, a first instance of a first data object type is created. From a remote data source, at 710, a first set of data is received for the first instance of the first data object type. The first set of data is data extracted from a remote data object of the remote data source. At 715, the data is stored in the first instance of the first object type. It is determined at 720 that the first instance of the first object type is out of date compared with the remote data object. At 725, a second set of data is received for the first instance of the first data object type. The second set of data is updated data for the remote data object. At least a portion of the first set of data is replaced, at 730, with data of the second set of data in the first instance of the first object type.

Example 9—Computing Systems

Figure 8:
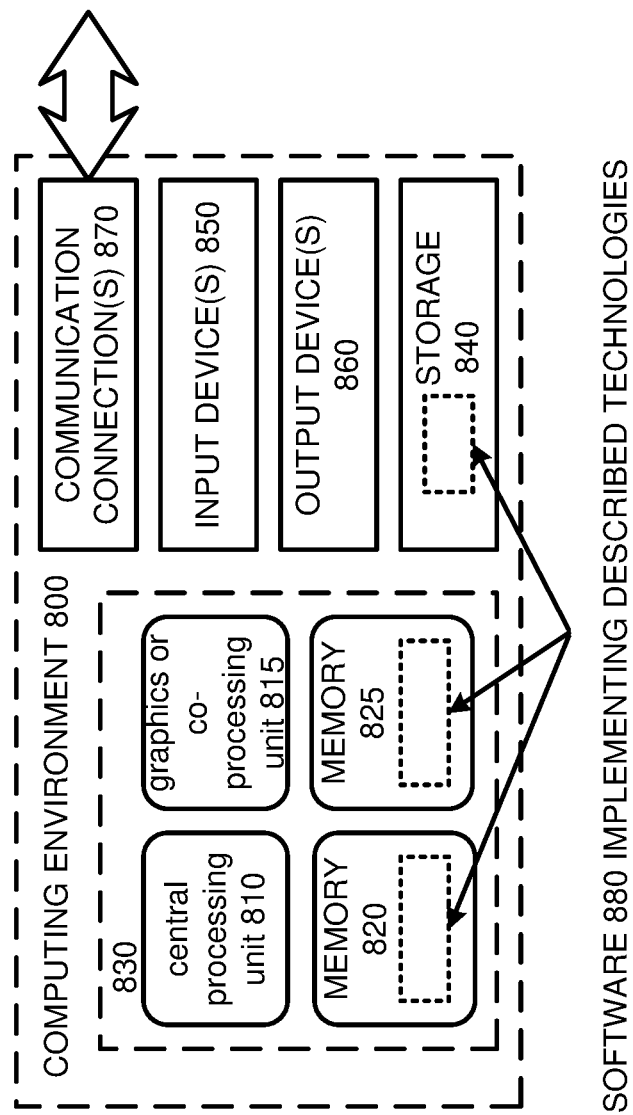
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality of the present disclosure, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing a database environment, and associated methods, described in Examples 1-8. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), nonvolatile memory (e.g., ROM, EEPROM, flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815.

A computing system 800 may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way, and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. The output device(s) 860 may be a display, printer, speaker, CD-writer, or another device that provides output from the computing system 800.

The communication connection(s) 870 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 9:
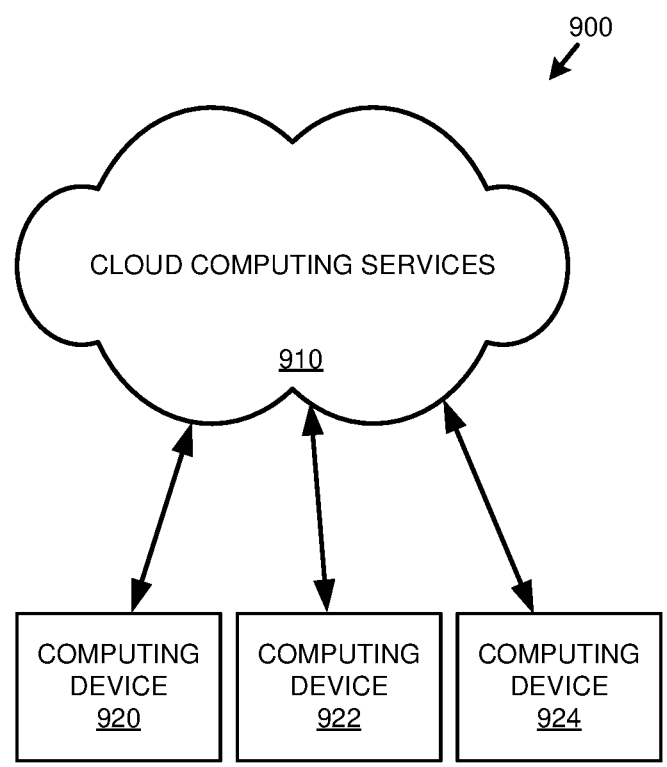
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries). The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operators (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 8, computer-readable storage media include memory 820 and 825, and storage 840. The term computer-readable storage media does not include signals and carrier waves. In addition, the term computer-readable storage media does not include communication connections (e.g., 870).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, Structured Query Language, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one memory;
one or more hardware processor units coupled to the at least one memory; and
one or more computer readable storage media storing computer-executable instructions that, when executed, cause the computing system to perform operations comprising:
at a local data source, creating a first instance of a first data object type;
at the local data source, receiving from a remote data source a first set of data for storage in the first instance of the first data object type, the first set of data having been extracted from a remote data object of the remote data source;
at the local data source, storing the first set of data in the first instance of the first data object type;
at the local data source, determining, or receiving an indication from the remote data source, that the first instance of the first data object type is out of date compared with the remote data object;

at the local data source, receiving from the remote data source a second set of data for the first instance of the first data object type, the second set of data being updated data for the remote data object; and at the local data source, replacing at least a portion of the first set of data with updated data of the second set of data in the first instance of the first data object type.

2. The computing system of claim 1, the operations further comprising:

receiving a query;

determining that the query accesses the first instance of the first data object type; and initiating the determining based at least in part on determining that the query accesses the first instance of the first data object type.

3. The computing system of claim 2, the operations further comprising:

delaying execution of the query until the replacing has been completed.

4. The computing system of claim 3, wherein the delaying is performed in response to a command in the query.

5. The computing system of claim 2, the operations further comprising:

executing the query prior to the replacing.

6. The computing system of claim 5, wherein the executing the query prior to the replacing is performed in response to a command in the query.

7. The computing system of claim 2, the operations further comprising:

executing at least a portion of the query accessing the first instance of the first data object type on the remote data object.

8. The computing system of claim 7, wherein the executing the at least a portion of the query accessing the first instance of the first data object type on the remote data object is performed in response to a command in the query.

9. The computing system of claim 1, wherein the determining that the first instance of the first data object type is out of date comprises comparing a digest value generated from content of the first set of data with a digest value generated from contents of the remote data object and being maintained in current metadata for the remote data object.

10. The computing system of claim 1, wherein the determining that the first instance of the first data object type source is out of date comprises comparing statistics maintained for the first instance of the first data object type with statistics maintained in current metadata for the remote data object.

11. The computing system of claim 1, wherein the determining that the first instance of the first data object type is out of date comprises comparing a last modified date maintained for the first instance of the first data object type with a last modified date maintained in current metadata for the remote data object.

12. The computing system of claim 1, wherein the determining that the first instance of the first data object type is out of date comprises comparing a size maintained for the first instance of the first data object type with a size maintained in current metadata for the remote data object.

13. The computing system of claim 1, wherein the first data object type comprises an identifier indicating whether a query that accesses an instance of the first data object type is to be performed using the instance of the first data object type on the local data source or is to be performed on the remote data object.

14. The computing system of claim 1, wherein the determining is initiated based on an occurrence of a trigger.

15. The computing system of claim 1, wherein the determining is initiated based on a synchronization schedule.

16. The computing system of claim 1, wherein the remote data object and the first data object type share a common set of semantic attributes.

17. The computing system of claim 1, wherein the remote data object and the first data object type are relational database tables.

18. The computing system of claim 1, wherein the determining is performed at the remote data source.

19. A method, implemented in a computing system comprising at least one hardware processor and at least one memory coupled to the at least one hardware processor, the method comprising:

at a local data source, creating a first instance of a first data object type;

at the local data source, receiving from a remote data source a first set of data for the first instance of the first data object type, the first set of data having been extracted from a remote data object of the remote data source;

at the local data source, storing the first set of data in the first instance of the first data object type;

at the local data source, determining, or receiving an indication from the remote data source, that the first instance of the first data object type is out of date compared with the remote data object;

at the local data source, receiving from the remote data source a second set of data for the first instance of the first data object type, the second set of data being updated data for the remote data object; and at the local data source, replacing at least a portion of the first set of data with updated data of the second set of data in the first instance of the first data object type.

20. The method of claim 19, further comprising:

receiving a query;

determining that the query accesses the first instance of the first data object type; and initiating the determining based at least in part on determining that the query accesses the first instance of the first data object type.

21. The method of claim 20, further comprising:

delaying execution of the query until the replacing has been completed.

22. The method of claim 20, further comprising:

executing the query prior to the replacing.

23. The method of claim 20, further comprising:

executing at least a portion of the query accessing the first instance of the first data object type on the remote data object.

24. The method of claim 19, wherein the determining that the first instance of the first data object type is out of date comprises comparing a digest value generated from content of the first set of data with a digest value generated from contents of the remote data object and being maintained in current metadata for the remote data object.

25. The method of claim 19, wherein the first data object type comprises an identifier indicating whether a query that accesses an instance of the first data object type is to be performed using the instance of the first data object type on the local data source or is to be performed on the remote data object.

26. The method of claim 19, wherein the determining is initiated based on an occurrence of a trigger or is initiated based on a synchronization schedule.

27. One or more non-transitory computer-readable storage media comprising:
computer-executable instructions that, when executed by a computing system comprising at least one hardware processor and at a least one memory coupled to the at least one hardware processor, cause the computing system to, at a local data source, create a first instance of a first data object type;
computer-executable instructions that, when executed by the computing system, cause the computing system to, at the local data source, receive from a remote data source a first set of data for the first instance of the first data object type, the first set of data having been extracted from a remote data object of the remote data source;
computer-executable instructions that, when executed by the computing system, cause the computing system to, at the local data source, store the first set of data in the first instance of the first data object type;
computer-executable instructions that, when executed by the computing system, cause the computing system to, at the local data source, determine, or receive an indication from the remote data source, that the first instance of the first data object type is out of date compared with the remote data object;
computer-executable instructions that, when executed by the computing system, cause the computing system to, at the local data source, receive from the remote data source a second set of data for the first instance of the first data object type, the second set of data being updated data for the remote data object; and
computer-executable instructions that, when executed by the computing system, cause the computing system to, at the local data source, replace at least a portion of the first set of data with data of the second set of data in the first instance of the first data object type.

28. The one or more non-transitory computer-readable storage media of claim 27, further comprising:
computer-executable instructions that, when executed by the computing system, cause the computing system to receive a query;
computer-executable instructions that, when executed by the computing system, cause the computing system to determine that the query accesses the first instance of the first data object type; and
computer-executable instructions that, when executed by the computing system, cause the computing system to initiate the determining based at least in part on determining that the query accesses the first instance of the first data object type.

29. The one or more non-transitory computer-readable storage media of claim 28, further comprising:
computer-executable instructions that, when executed by the computing system, cause the computing system to delay execution of the query until the replacing has been completed.

30. The one or more non-transitory computer-readable storage media of claim 28, further comprising:
computer-executable instructions that, when executed by the computing system, cause the computing system to execute the query prior to the replacing.

31. The one or more non-transitory computer-readable storage media of claim 28, further comprising:
computer-executable instructions that, when executed by the computing system, cause the computing system to execute at least a portion of the query accessing the first instance of the first data object type on the remote data object.

32. The one or more non-transitory computer-readable storage media of claim 27, wherein the determining that the first instance of the first data object type is out of date comprises comparing a digest value generated from content of the first set of data with a digest value generated from contents of the remote data object and being maintained in current metadata for the remote data object.

33. The one or more non-transitory computer-readable storage media of claim 27, wherein the first data object type comprises an identifier indicating whether a query that accesses an instance of the first data object type is to be performed using the instance of the first data object type on the local data source or is to be performed on the remote data object.

34. The one or more non-transitory computer-readable storage media of claim 27, wherein the determining is initiated based on an occurrence of a trigger or is initiated based on a synchronization schedule.

* * * * *